United States Patent [19]

Shimohiro et al.

[11] Patent Number: 5,177,066
[45] Date of Patent: Jan. 5, 1993

[54] STABILIZATION OF COMPOSITIONS CONTAINING ANIONIC SURFACTANTS

[75] Inventors: Yoshiyuki Shimohiro, Sakai; Masazo Ogawa, Osaka; Seiji Aoki, Kyoto, all of Japan

[73] Assignee: Dainippon Pharmaceutical Co., Ltd., Osaka, Japan

[21] Appl. No.: 687,917

[22] PCT Filed: Dec. 7, 1989

[86] PCT No.: PCT/JP89/01230

§ 371 Date: Jun. 7, 1991

§ 102(e) Date: Jun. 7, 1991

[87] PCT Pub. No.: WO90/06174

PCT Pub. Date: Jun. 14, 1990

[30] Foreign Application Priority Data

Dec. 9, 1988 [JP] Japan .................. 63-312650

[51] Int. Cl.$^5$ .................. A61K 31/715; A61K 31/70; C08B 37/00
[52] U.S. Cl. .................. 514/54; 514/23; 514/970; 514/975; 536/114; 536/123; 424/70; 106/208; 8/908
[58] Field of Search .............. 536/114, 124, 1.1, 123; 514/23, 54

[56] References Cited

U.S. PATENT DOCUMENTS

| | | |
|---|---|---|
| 3,163,602 | 12/1964 | Lindblom et al. . |
| 3,244,695 | 4/1966 | Schweiger . |
| 3,505,310 | 4/1970 | Nordgren et al. . |
| 4,060,489 | 11/1977 | Chiesa .................. 536/1.1 |
| 4,663,159 | 5/1987 | Brode, II et al. . |
| 4,696,677 | 9/1987 | Colegrove et al. . |
| 4,792,415 | 12/1988 | Colegrove . |
| 4,874,854 | 10/1989 | Colegrove et al. . |
| 4,999,047 | 3/1991 | Schuppiser .................. 536/114 |
| 5,003,060 | 3/1991 | Vinot .................. 536/114 |

FOREIGN PATENT DOCUMENTS 57-58601 4/1982 Japan .
58-46968 3/1983 Japan .

Primary Examiner—Johnnie R. Brown
Assistant Examiner—Everett White
Attorney, Agent, or Firm—Armstrong & Kubovcik

[57] ABSTRACT

A process for stabilizing a composition containing an anionic surfactant by using a cationized xanthan gum, a stabilizer for the composition containing an anionic surfactant which contains a cationized xanthan gum as a component, and a anionic surfactant-containing composition stabilized by inclusion of a cationized xanthan gum.

5 Claims, No Drawings

STABILIZATION OF COMPOSITIONS CONTAINING ANIONIC SURFACTANTS

DESCRIPTION

1. Technical Field

The present invention relates to stabilization of a composition containing an anionic surfactant. More particularly, the invention relates to a process for stabilizing a composition containing an anionic surfactant by use of a cationized xanthan gum, a stabilizer containing a cationized xanthan gum as a component for the anionic surfactant-containing composition, and a stabilized anionic surfactant-containing composition containing a cationized xanthan gum.

2. Background Art

Anionic surfactants have been used in various industrial fields for various purposes, for example, as assistants for washing, penetration and dyeing in textile industry, as dispersants for dyestuffs, pigments and inks in colorant industry, as a base of dispersants and spreaders for water-dispersible powders and flowable preparations in agricultural chemical industry, as consolidation inhibitors in fertilizer industry, as water-reducing agents and superplasticizers in building and civil engineering industry, as dispersants for paper processing in paper and pulp industry, as emulsifiers for emulsion polymerization in rubber and plastic industry, and as raw materials for hair care cosmetics and foaming agents for dentifrices in pharmaceutical and cosmetic industry. For the purpose of increasing viscosity or stabilizing suspension of compositions containing anionic surfactants, colloidal silica, bentonite and the like have hitherto been used, but no sufficient effect is obtained.

Xanthan gum is an anionic high molecular polysaccharide that pure cultured microorganism Xanthomonas Campestris accumulates extracellularly in fermentation step. The constituent monosaccharides thereof are glucose, mannose and glucuronic acid present in a glucose:mannose:glucuronic acid ratio of 2:2:1. Since xanthan gum shows a very pseudo-plasticity and a high viscosity and has a thickening property, a high suspension stabilizing property and special rheological properties, it has been used in various fields.

However, xanthan gum does not show its original viscosity in the presence of an anionic surfactant, and particularly, in a composition containing not less than 15% by weight of an anionic surfactant the xanthan gum is salted out or is insoluble, and it is present in the form of xanthan gum particles in the system. Since xanthan gum cannot exhibit the thickening or suspension-stabilizing characteristics for compositions containing anionic surfactants, it has not been able to be used as a stabilizer for the compositions.

Also, various modified xanthan gums are known. A cationized xanthan gum is disclosed in U.S. Pat. No. 3,244,695, Japanese Patent Publication Kokoku No. 47-2846 and Japanese Patent Publication Kokai No. 62-243601. In these publications, it is disclosed that cationized xanthan gum has a suspending property, a coagulating property and a resistance to decomposition by bacteria, but in general it shows behaviors similar to xanthan gum. Consequently, cationized xanthan gum has not been used for the purpose of thickening or suspension-stabilization of compositions containing anionic surfactants.

DISCLOSURE OF THE INVENTION

The present inventors have found that despite no difference from xanthan gum in properties such as viscosity, cationized xanthan gum unexpectedly exhibits excellent effects when used as a thickening agent or suspension-stabilizing agent for compositions containing anionic surfactants to which xanthan gum has not been able to be applied. Thus, they have accomplished the present invention.

The present invention provides a process for stabilizing a composition containing an anionic surfactant which comprises incorporating a cationized xanthan gum in the composition containing an anionic surfactant.

In accordance with another aspect of the present invention, there is provided a stabilizer suitable for use in a composition containing an anionic surfactant, which contains a cationized xanthan gum as a component.

In accordance with still another aspect of the present invention, there is provided a stabilized composition comprising a cationized xanthan gum and an anionic surfactant.

The cationized xanthan gum used in the present invention can be prepared by a method as described in U.S. Pat. No. 3,244,695 and Japanese Patent Publication Kokoku No. 47-2846. That is to say, it is easily produced by uniformly mixing xanthan gum and a cationizing agent in the form of an aqueous solution, an aqueous slurry, an organic solvent solution, an organic solvent slurry or an organic solvent suspension. The reaction temperature may be room temperature, but since the rate of reaction can be accelerated by heating, it can be suitably selected from about 10° to about 90° C. Also, an alkaline catalyst such as an alkali metal hydroxide or an alkaline earth metal hydroxide can be used in order to accelerate the reaction.

The following compounds are mentioned as the cationizing agent, but any known cationizing agents can be used without being limited to the following compounds; e.g. hexamethonium chloride, decamethonium chloride, phenyltrimethylammonium chloride, benzyltrimethylammonium chloride, tetra-n-butylammonium chloride, tetramethylammonium chloride, 2,3-epoxypropyltrimethylammonium chloride, 3-chloro-2-hydroxypropyltrimethylammonium chloride, and the like. Particularly useful compounds are 2,3-epoxypropyltrimethylammonium chloride and 3-chloro-2-hydroxypropyltrimethylammonium chloride.

The cationized xanthan gum is applicable to various compositions containing anionic surfactants, and by blending it in these compositions, it is possible to increase the viscosity of the compositions, and to stabilize compositions, particularly emulsion, dispersion and suspension compositions. It is suitable that the content of the cationized xanthan gum in the compositions is from 0.01 to 2.0% by weight, preferably from 0.05 to 1.5% by weight.

Examples of the anionic surfactant are, for instance, a carboxylate surfactant such as a fatty acid salt, a sulfonate surfactant such as sodium naphthalene sulfonate formaldehyde condensation product, a sulfate surfactant such as an alkyl sulfate, and a phosphate surfactant such as an alkyl phosphate. The anionic surfactants included in the anionic surfactant-containing compositions are not necessarily limited to the exemplified compounds.

The stabilizer used for the anionic surfactant-containing compositions in the present invention contains the cationized xanthan gum as a component. The cationized xanthan gum can be used alone as the stabilizer, but the stabilizer may contain 0.01 to 90% by weight of other components unless they impair the thickening or suspension-stabilizing effect of the cationized xanthan gum. As the other components, for instance, there can be used a non-ionic surfactant usually used for emulsification or dispersing, a known thickening or dispersion-stabilizing agent, and a mixture thereof. Representative examples of the nonionic surfactant are, for instance, a polyoxyethylene alkyl ether and a polyoxyethylene sorbitan fatty acid ester. Representative examples of the known thickening or dispersion-stabilizing agent are, for instance, starch and its derivatives, a cellulose derivative such as hydroxypropyl cellulose or cationized cellulose, a vegetable natural gum such as gum arabic or guar gum, a seaweed extract such as carageenan, a synthetic water-soluble polymer such as polyvinyl alcohol or polyvinyl pyrrolidone, an inorganic thickner such as bentonite, and the like.

According to the present invention, by using the cationized xanthan gum it is possible to impart an increased viscosity and a suspension stability to every compositions containing anionic surfactants. In particular, marked effects can be obtained in compositions containing not less than 15% by weight of anionic surfactants. Accordingly, the cationized xanthan gum can be suitably applied, for instance, to an aqueous composition containing an anionic surfactant in as large amount as 15 to 50% by weight, e.g. dyes, pigments and inks in colorant industry and hair care cosmetics in pharmaceutical and cosmetic industry, for the purpose of increasing the viscosity or stabilizing the composition.

Further, particularly excellent effects are obtained when the N content of the cationized xanthan gum used in the present invention is not less than 0.8% by weight.

BEST MODE FOR CARRYING OUT THE INVENTION

The present invention is explained below in more detail with reference to Preparation Examples, Comparative Examples and Examples, but it is to be understood that the present invention is not limited thereto. In these Examples, all % are by weight unless otherwise noted. The measurement of the N content was made using a 2400CHN elemental analyser (made by The Perkin-Elmer Corporation). Also, the measurement of viscosity was made at 25° C. and 60 r.p.m. using a BL type Brookfield viscometer (made by Tokyo Keiki Co., Ltd.). A 1.0% aqueous solution of xanthan gum used as the raw material had a viscosity of 970 cps.

PREPARATION EXAMPLE 1

Preparation of Cationized Xanthan Gum

In 100 g of distilled water was dissolved 2 g of tetra-n-butylammonium chloride. On the other hand, 2 g of xanthan gum (Kelzan ®, made by Kelco, Division of Merck & Co., Inc.) was dissolved in 100 g of distilled water. To this solution was added the above ammonium solution with stirring. After mixing at room temperature for 1 hour, 400 ml of isopropanol was added to the mixture to produce a precipitate, and the precipitate was dried and pulverized to give 2.3 g of a cationized xanthan gum powder. The N content was 0.65%. The viscosity of a 1.0% aqueous solution thereof was 970 cps, and no difference in viscosity was observed between the product and the unreacted xanthan gum.

PREPARATION EXAMPLE 2

Preparation of Cationized Xanthan Gum

To 100 g of distilled water was added 4 g of a 50% solution of 3-chloro-2-hydroxypropyltrimethylammonium chloride (Catiomaster ® C, made by Yokkaichi Chemical Co., Ltd.). On the other hand, 2 g of xanthan gum (Kelzan ®, made by Kelco, Division of Merck & Co., Inc.) was dissolved in 100 g of distilled water. To this solution was added the above ammonium solution with stirring. After mixing at room temperature for 1 hour, 400 ml of isopropanol was added to the mixture to produce a precipitate, and the precipitate was dried and pulverized to give 2.2 g of a cationized xanthan gum powder. The N content was 0.45%. The viscosity of a 1.0% aqueous solution thereof was 1,000 cps, and no difference in viscosity was observed between the product and the unreacted xanthan gum.

PREPARATION EXAMPLE 3

Preparation of Cationized Xanthan Gum

To 100 g of distilled water was added 4 g of a 50% solution of 3-chloro-2-hydroxypropyltrimethylammonium chloride (Catiomaster ® C, made by Yokkaichi Chemical Co., Ltd.). On the other hand, 2 g of xanthan gum (Kelzan ®, made by Kelco, Division of Merck & Co., Inc.) was dissolved in 100 g of distilled water to which 2 g of NaOH was added. To this solution was added the above ammonium solution with stirring. After mixing at room temperature for 1 hour, the mixture was neutralized with sulfuric acid, 400 ml of isopropanol was added to the mixture to produce a precipitate, and the precipitate was dried and pulverized to give 2.3 g of a cationized xanthan gum powder. The N content was 0.80%. The viscosity of a 1.0% aqueous solution thereof was 1,100 cps, and no difference in viscosity was seen between the product and the unreacted xanthan gum.

PREPARATION EXAMPLE 4

Preparation of Cationized Xanthan Gum

The following components were added to a three-necked flask equipped with a thermometer, a stirrer and a reflux condenser.

| | |
|---|---|
| Xanthan gum (Kelzan ®, made by Kelco, Division of Merck & Co., Inc.) | 125 g |
| Isopropanol (reagent) | 450 ml |
| NaOH (15 g dissolved in 300 g of distilled water) | 300 ml |
| 50% Solution of 3-chloro-2-hydroxypropyltrimethylammonium chloride (Catiomaster ® C, made by Yokkaichi Chemical Co., Ltd.) | 37.5 g |

The reaction was carried out at a temperature of 50° to 55° C. for about 4 hours with stirring. The reaction mixture was cooled to room temperature, neutralized with sulfuric acid, filtered with suction, and washed with isopropanol. The product was dried and pulverized to give 147 g of a cationized xanthan gum powder. The N content was 1.10%. The viscosity of a 1.0% aqueous solution thereof was 1,030 cps, and no difference in viscosity was seen between the product and the unreacted xanthan gum.

PREPARATION EXAMPLE 5

Preparation of Cationized Xanthan Gum

The procedure of Preparation Example 4 was repeated except that 24.5 g of a 77% solution of 2,3-epoxypropyltrimethylammonium chloride (Catiomaster® G, made by Yokkaichi Chemical Co., Ltd.) was used instead of the 50% solution of 3-chloro-2-hydroxypropyltrimethylammonium chloride, to give 142 g of a cationized xanthan gum powder. The N content was 1.04%. The viscosity of a 1.0% aqueous solution thereof was 1,050 cps, and no difference in viscosity was seen between the product and the unreacted xanthan gum.

PREPARATION EXAMPLE 6

Preparation of Cationized Xanthan Gum

The procedure of Preparation Example 4 was repeated except that 25 g of NaOH and 62.5 g of the 50% solution of 3-chloro-2-hydroxypropyltrimethylammonium chloride (Catiomaster® C, made by Yokkaichi Chemical Co., Ltd.) were used, to give 160 g of a cationized xanthan gum powder. The N content was 1.21%. The viscosity of a 1.0% aqueous solution thereof was 1,030 cps, and no difference in viscosity was seen between the product and the unreacted xanthan gum.

PREPARATION EXAMPLE 7

Preparation of Cationized Xanthan Gum

The procedure of Preparation Example 4 was repeated except that 12 g of NaOH and 25 g of the 50% solution of 3-chloro-2-hydroxypropyltrimethylammonium chloride (Catiomaster® C, made by Yokkaichi Chemical Co., Ltd.) were used, to give 136 g of a cationized xanthan gum powder. The N content was 0.87%. The viscosity of a 1.0% aqueous solution thereof was 1.140 cps, and no difference in viscosity was seen between the product and the unreacted xanthan gum.

PREPARATION EXAMPLE 8

Preparation of Cationized Xanthan Gum

The procedure of Preparation Example 4 was repeated except that 10 g of NaOH and 20.0 g of the 50% solution of 3-chloro-2-hydroxypropyltrimethylammonium chloride (Catiomaster® C, made by Yokkaichi Chemical Co., Ltd.) were used, to give 131 g of a cationized xanthan gum powder. The N content was 0.75%. The viscosity of a 1.0% aqueous solution thereof was 1,150 cps, and no difference in viscosity was seen between the product and the unreacted xanthan gum.

COMPARATIVE EXAMPLE 1

The procedure of Preparation Example 4 was repeated except that the 50% solution of 3-chloro-2-hydroxypropyltrimethylammonium chloride (Catiomaster® C, made by Yokkaichi Chemical Co., Ltd.) was not used, to give 129 g of a xanthan gum powder. The N content was 0.33%. The viscosity of a 1.0% aqueous solution thereof was 1,100 cps.

EXAMPLE 1

Dissolution Test in Anionic Surfactants

A test of dissolution in an aqueous solution of an anionic surfactant was made according to the following method by using the cationized xanthan gums obtained in Preparation Examples 1 to 8 and using as a control the xanthan gum obtained in Comparative Example 1 and unreacted xanthan gum (Kelzan®, made by Kelco, Division of Merck & Co., Inc.).

To 100 g of a distilled water solution of an anionic surfactant adjusted to a predetermined concentration was added 1 g (corresponding to 1% concentration) of the cationized xanthan gum obtained in Preparation Examples 1 to 8, xanthan gum obtained in Comparative Example 1 or unreacted xanthan gum with stirring. After stirring for 1 hour, the mixture was allowed to stand overnight and the viscosity of each of the obtained solutions was measured in order to estimate the solubility.

Also, the solubility was examined in the same manner as above by, after adding 1 g of a xanthan gum powder, adding 1 g of tetra-n-butylammonium chloride (hereinafter referred to as TNBA).

The results are shown in Table 1. In the anionic surfactant-containing solutions, xanthan gum did not dissolve and it did not show the original viscosity of itself. However, in case of the cationized xanthan gum, the original viscosity of xanthan gum own was obtained, thus a viscosity-increasing effect could be obtained even in systems containing anionic surfactants.

TABLE 1

| | Anionic surfactant | Concentration of surfactant | Viscosity revealed by dissolution |
|---|---|---|---|
| Preparation Example 1 | Demol® RN | 25% | 40 cps |
| Preparation Example 2 | Demol® RN | 25% | 65 cps |
| Preparation Example 3 | Demol® RN | 25% | 630 cps |
| Preparation Example 4 | Demol® RN | 25% | 1030 cps |
| Preparation Example 5 | Demol® RN | 25% | 1050 cps |
| Preparation Example 6 | Demol® RN | 25% | 980 cps |
| Preparation Example 7 | Demol® RN | 25% | 1000 cps |
| Preparation Example 8 | Demol® RN | 25% | 550 cps |
| Comparative Example 1 | Demol® RN | 25% | not dissolved |
| Xanthan gum | Demol® RN | 25% | not dissolved |
| Xanthan gum + TNBA | Demol® RN | 25% | not dissolved |
| Preparation Example 4 | Demol® RN | 20% | 1030 cps |
| Preparation Example 5 | Demol® RN | 20% | 1080 cps |
| Preparation Example 6 | Demol® RN | 20% | 1030 cps |
| Preparation Example 7 | Demol® RN | 20% | 1100 cps |
| Preparation Example 8 | Demol® RN | 20% | 780 cps |
| Xanthan gum | Demol® RN | 20% | 480 cps |
| Preparation Example 4 | Emal® 0 powder | 20% | 370 cps |
| Preparation Example 5 | Emal® 0 powder | 20% | 350 cps |
| Xanthan gum | Emal® 0 powder | 20% | not dissolved |

Demol® RN (made by Kao Corporation): Sodium naphthalene sulfonate formaldehyde condensation product
Emal® 0 powder (made by Kao Corporation): Sodium lauryl sulfate

EXAMPLE 2

Liquid Dyestuff for Textile Dyeing

A liquid dyestuff was prepared according to the following recipe by using the cationized xanthan gum obtained in Preparation Example 4.

| Components | Amount (g) |
| --- | --- |
| Disperse dye<br>Sumikaron ® navy blue S-2GL 200%<br>(made by Sumitomo Chemical Co. Ltd.) | 30.0 |
| Dispersant<br>Demol ® N (made by Kao Corporation) | 15.0 |
| Cationized xanthan gum obtained in<br>Pre. Ex. 4 | 0.3 |
| Water | balance |
| Total | 100 |

A thermal stability test was made with respect to the thus obtained liquid dyestuff for textile dyeing.

Testing Method

The above composition was prepared, and after allowing to stand overnight, the viscosity was measured. Further, the change in viscosity was examined by storing the composition in a closed state in a constant temperature oven at 50° C. for 1 month and measuring the viscosity again.

As a result, even after storing for 1 month the viscosity was not different from that just after the preparation. Also, influence on the hue of dyed textile was scarcely observed. On the other hand, in case of a liquid dyestuff for textile dyeing using xanthan gum in the above recipe, xanthan gum did not dissolve due to inclusion of the anionic surfactant in a half amount of the disperse dye, thus no homogeneous liquid dyestuff could be prepared. Also, when neither the cationized xanthan gum nor xanthan gum were used, no homogeneous dyestuff for textile dyeing was obtained due to precipitation of disperse dye.

EXAMPLE 3

Shampoo

A shampoo was prepared according to the following recipe by using the cationized xanthan gum obtained in Preparation Example 4.

| Components | Amount (g) |
| --- | --- |
| Surfactant. Emal ® 10 powder<br>(sodium lauryl sulfate, made by Kao Corp.) | 25.0 |
| Surfactant. Emal ® TD<br>(triethanolamine lauryl sulfate, made by Kao Corp.) | 5.0 |
| Cationized xanthan gum obtained in<br>Pre. Ex. 4 | 0.3 |
| Colorant and perfume | sufficient |
| Water | balance |
| Total | 100 |

With respect to the thus prepared shampoo, the thermal stability test was made in the same manner as in Example 2. As a result, even after storing for 1 month the viscosity was not different from that just after the preparation. On the other hand, in case of a shampoo using xanthan gum in the above recipe, xanthan gum did not dissolve due to inclusion of not less than 15% of the anionic surfactant, thus no homogeneous shampoo could be prepared. Also, in case of using neither the cationized xanthan gum nor xanthan gum, only a shampoo which was hard to be put to practical use was obtained because not only the perfume was not stabilized, but also the viscosity was very low.

EXAMPLE 4

Powdery stabilizer

A powdery stabilizer was obtained by admixing 30 parts by weight of bentonite and 70 parts by weight of the cationized xanthan gum obtained in Preparation Example 4.

EXAMPLE 5

Liquid Stabilizer

A liquid stabilizer was obtained by admixing 10 parts by weight of a 10% aqueous solution of polyoxyethylene(20) sorbitan monooleate, 30 parts by weight of a 1% aqueous solution of cationized cellulose and 60 parts by weight of a 1% aqueous solution of the cationized xanthan gum obtained in Example 4.

INDUSTRIAL APPLICABILITY

Every composition containing anionic surfactants are stabilized by using a cationized xanthan gum.

We claim:

1. A process for stabilizing an aqueous composition containing from 15 to 50% by weight of an anionic surfactant which comprises incorporating a water-soluble cationized xanthan gum into the composition.

2. The process of claim 1, wherein said anionic surfactant is at least one member selected from the group consisting of carboxylate surfactants, sulfonate surfactants, sulfate surfactants and phosphate surfactants.

3. A stabilized aqueous composition comprising a water-soluble cationized xanthan gum and from 15 to 50% by weight of an anionic surfactant.

4. The composition of claim 3, wherein the content of said water-soluble cationized xanthan gum in the composition is from 0.01 to 2.0% by weight.

5. The composition of claim 3, wherein said anionic surfactant is at least one member selected from the group consisting of carboxylate surfactants, sulfonate surfactants, sulfate surfactants and phosphate surfactants.

* * * * *